United States Patent [19]

Tokumatsu et al.

[11] Patent Number: 5,235,475
[45] Date of Patent: Aug. 10, 1993

[54] DIGITAL AUDIO TAPE RECORDER

[75] Inventors: Hiromu Tokumatsu, Osaka; Mitsuru Shinohara; Hisao Kitazume, both of Gunma, all of Japan

[73] Assignee: Sanyo Electric Co., Ltd., Osaka, Japan

[21] Appl. No.: 675,841

[22] Filed: Mar. 27, 1991

[30] Foreign Application Priority Data

Mar. 27, 1990 [JP] Japan .................. 2-79636
Apr. 27, 1990 [JP] Japan ................. 2-114035

[51] Int. Cl.⁵ .................. G11B 20/18; G11B 27/19
[52] U.S. Cl. ............................ 360/72.2; 360/53
[58] Field of Search ....................... 360/72.2, 53

[56] References Cited

U.S. PATENT DOCUMENTS

| | | | |
|---|---|---|---|
| 4,890,171 | 12/1989 | Nagao ..................... | 360/72.2 |
| 4,958,244 | 9/1990 | Inazawa et al. ............ | 360/72.2 |
| 4,985,786 | 1/1991 | Arai et al. ............... | 360/72.2 |
| 5,021,896 | 6/1991 | Horino .................... | 360/72.2 |

FOREIGN PATENT DOCUMENTS 0300732  1/1989  European Pat. Off. .
3733270  4/1988  Fed. Rep. of Germany .
3827299  2/1989  Fed. Rep. of Germany .
2192089 12/1987  United Kingdom .

*Primary Examiner*—John S. Heyman
*Attorney, Agent, or Firm*—Armstrong, Westerman, Hattori, McLeland & Naughton

[57] ABSTRACT

A digital audio tape recorder having a function of reproducing the magnetic tape with digital data recorded thereon in the state of high-speed travelling by a plurality of rotary heads for the purpose of high-speed search and cue/review. In high-speed search, the parity of the read digital data is checked to select the digital data identified by the greatest majority. The data are selected after discriminating the data supplied from the sub code area 1 from the data supplied from the sub code area 2 in REW search but without such discrimination in FF search. In cue/review, the number of identified parities is counted for each of the plurality of rotary heads. The digital data read out by the magnetic head which has supplied the digital data having a smaller number of identified parities is prevented from reproduction. The digital data read out by the magnetic head which has supplied the digital data having a larger number of identified parities is interpolated and reproduced.

11 Claims, 12 Drawing Sheets

FIG.2

| SYNC 8 BITS | IDENTIFY CODE 8 BITS | BLOCK ADDRESS 8 BITS | PARITY 8 BITS | DATA OR PARITY 256 BITS (32 SYMBOLS) |
|---|---|---|---|---|
| | W1 | W2 | P | |

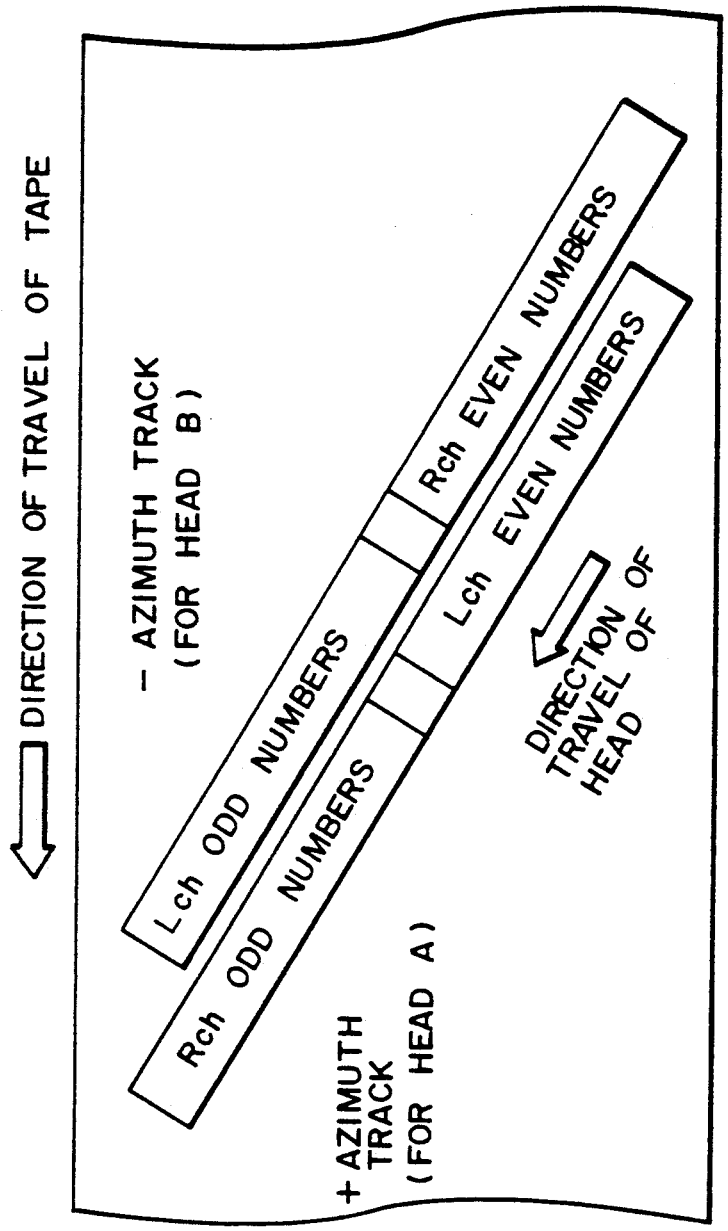

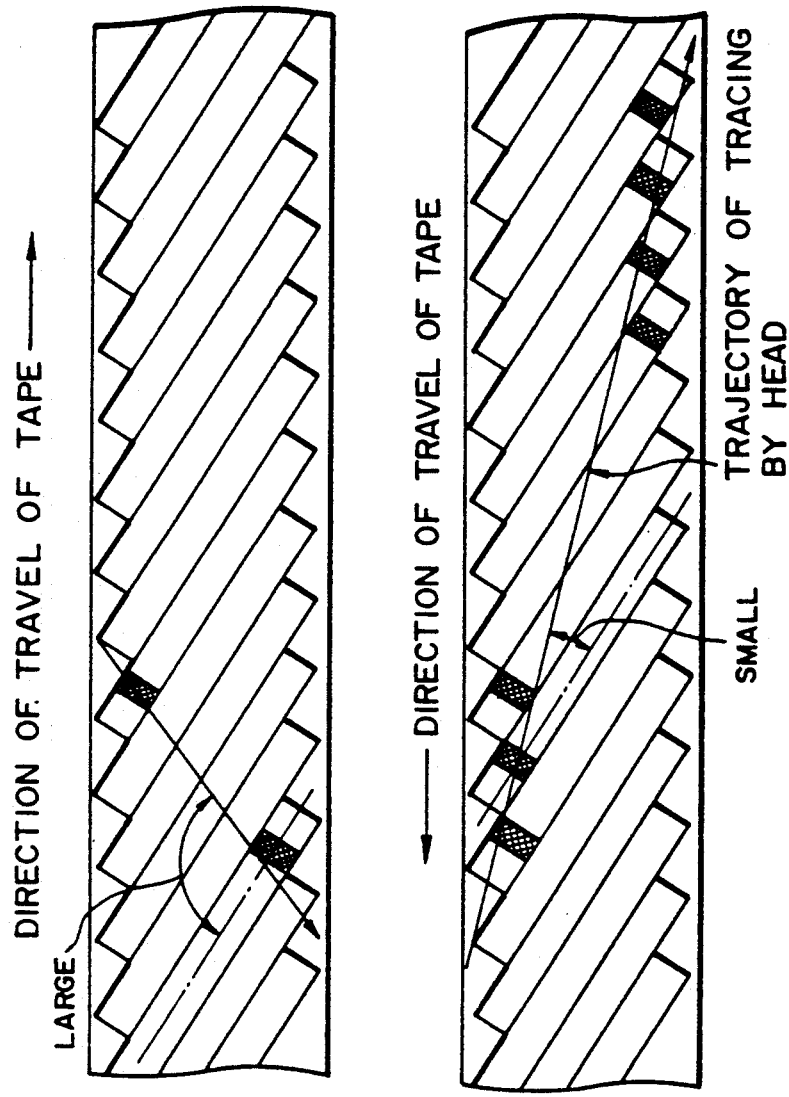

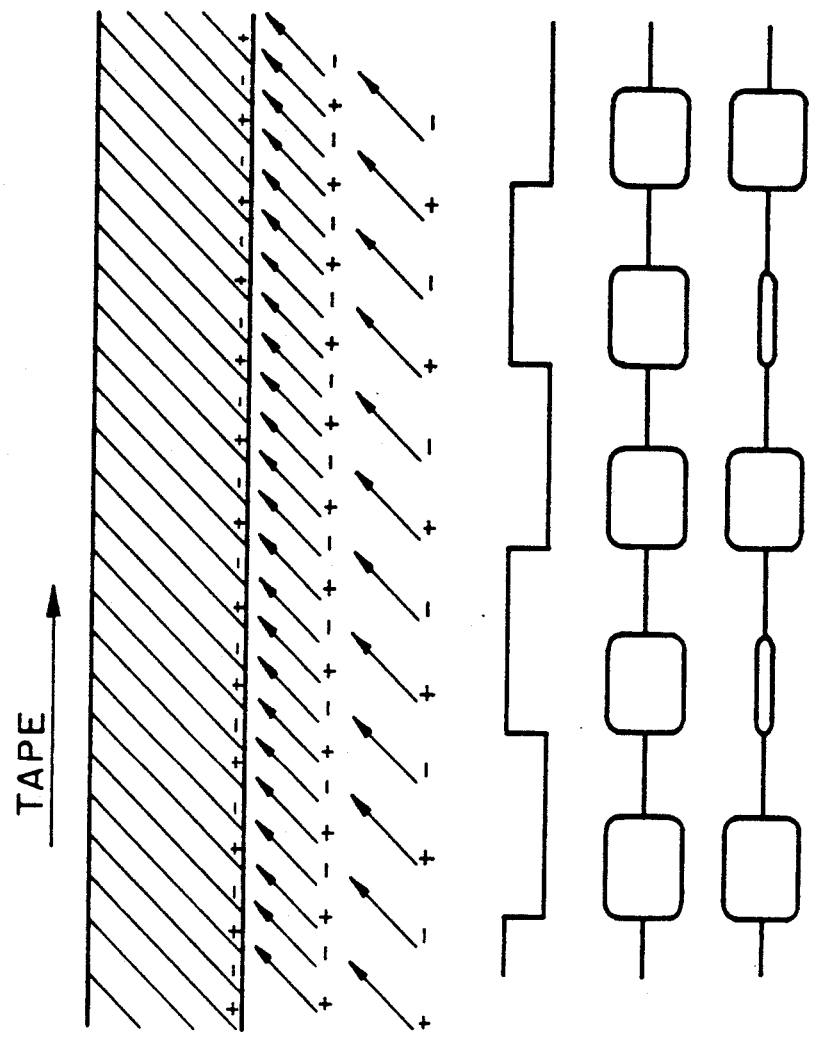

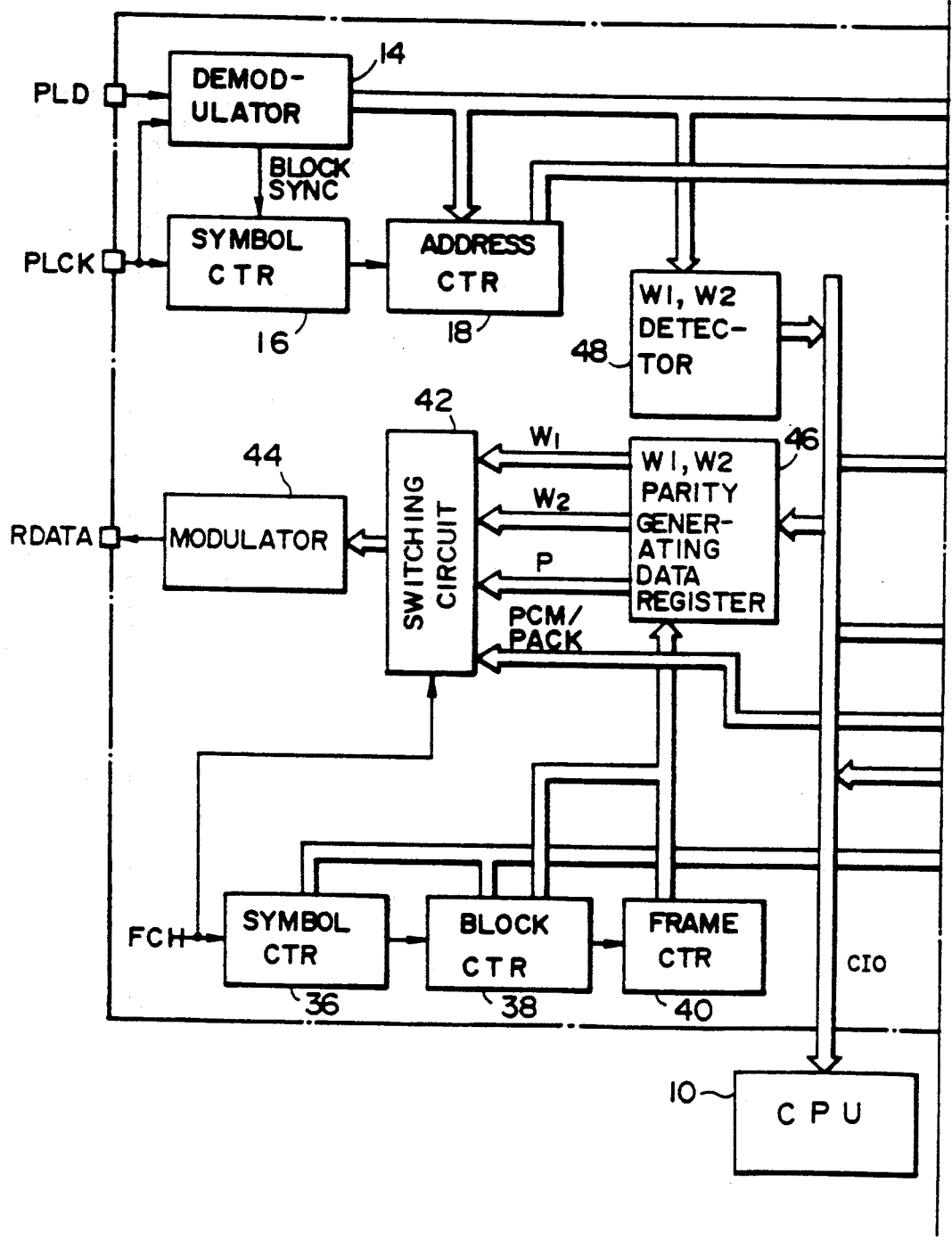

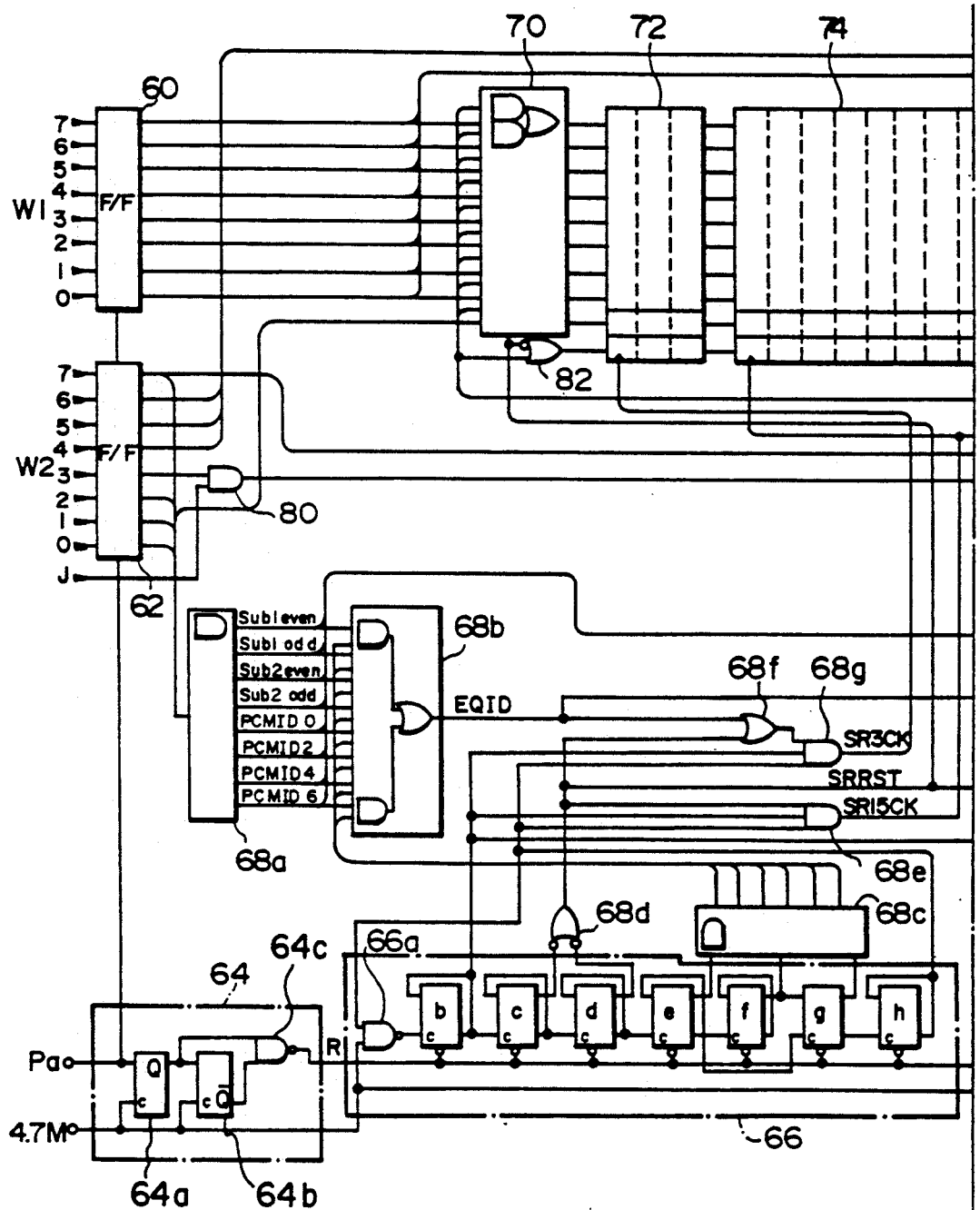

| FIG.9A | FIG.9B |

FIG.9B
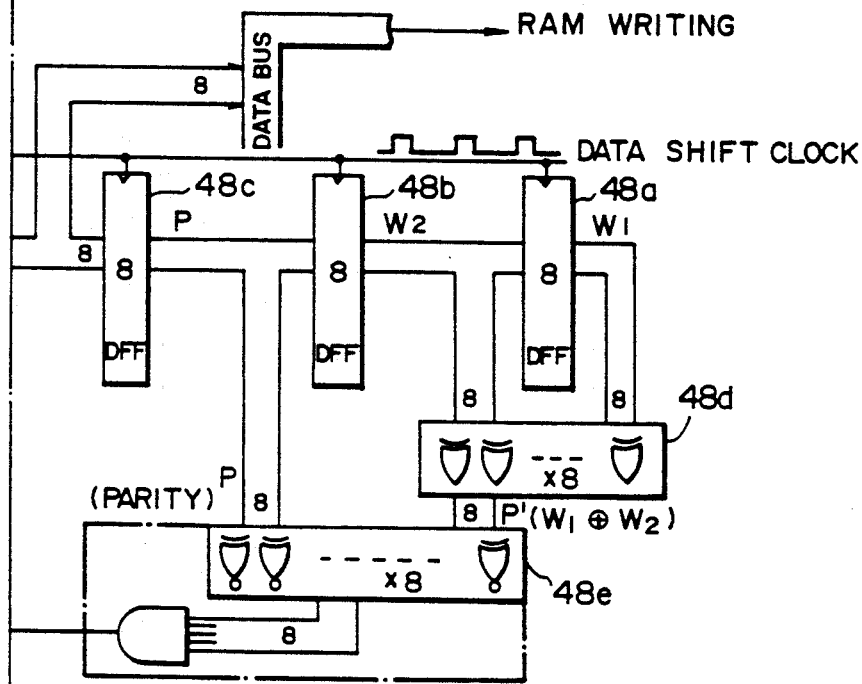
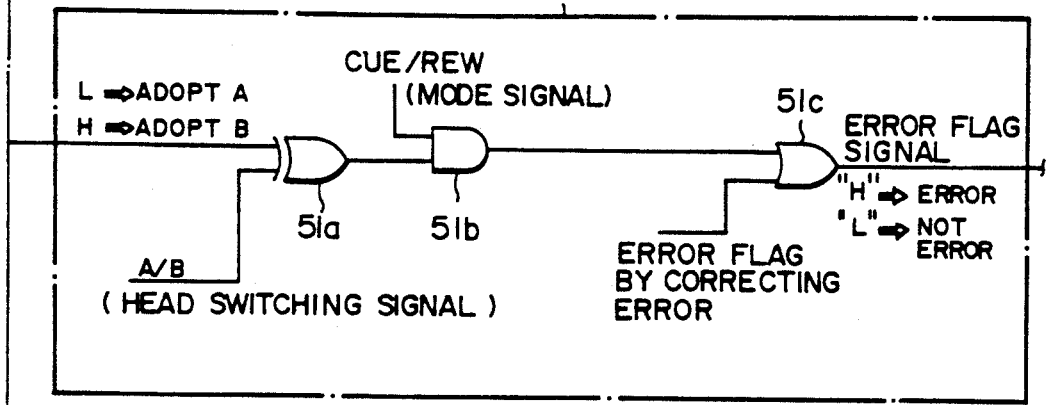

DIGITAL AUDIO TAPE RECORDER

BACKGROUND OF THE INVENTION

1. Field of the Invention

The present invention relates to the improvement of high-speed search and cue/review functions of a digital audio tape recorder using a rotary head (hereinunder referred to as "R-DAT").

2. Description of the Related Art

With the progress of digital technique, digital recording has come to be adopted for recording various signals. In the field of sound signal recording, compact disks and the like which adopt digital recording have become widespread.

Among these apparatuses which utilize digital recording, digital audio tape recorders (DAT) which are capable of not only reproducing but also recording a sound signal have attracted attention.

DAT's are advantageous in that since a sound signal is recorded on a magnetic tape as digital data, they are free from the problems such as wow flutter, hiss noise and modulation noise, which are inevitable in analog recording, and in that since they have a wide dynamic range which can realize flat frequency characteristics in a wide frequency, recording and reproduction with a high sound quality is realized.

There are two types of DAT's. One utilizes a rotary head, and the other utilizes a fixed head. DAT's using a rotary head (R-DAT) have been standardized and increasingly produced as manufactured goods.

In an R-DAT, a signal is stored in each track inclined at a little over 6° with respect to the plane in which the magnetic tape travels, as shown in FIG. 1.

Each track is separated into an area for recording sub codes consisting of various kinds of information necessary for reproduction, an area for recording an ATF signal for tracking, etc. as well as an area for recording digital sound data (PCM).

The plurality of areas which constitute a track are composed of a plurality of blocks each consisting of 8 bits of SYNC data for synchronizing data, 8 bits of ID code data W1 for designating a frame address, 8 bits of block address data W2 for identifying a block, 8 bits of parity P (simple parity, P=W1+W2) and data of 32 symbols (since 1 symbol consists of 8 bits, the data consists of 256 bits in total). The SUB area is composed of two 8 blocks and the PCM area is composed of 128 blocks.

The R-DAT adopts an interleave format for recording data in dispersion in two tracks in order to suppress the influence of a continuous data error, namely, a burst error to the minimum. In the interleave format, the data of even numbers of an L channel and the odd numbers of an R channel are recorded in one track of the two tracks having different azimuths and the data of even numbers of the R channel and the odd numbers of the L channel are recorded in the other track. By reproducing the L channel and the R channel from the pair of two tracks, it is possible to reproduce sound without break even if an error is produced on either of the two magnetic heads of the R-DAT.

The rotary head is provided with two magnetic heads for tracing tracks of the magnetic tape and two tracks are traced in one revolution of the rotary head. The magnetic tape is so designed as to come into contact with the rotary head which rotates at a high speed only in the range of 90°.

One of the important functions of the R-DAT is a high-speed search function. The high-speed search function is a function of detecting the beginning of a piece of music and cueing by causing the magnetic tape to travel at a speed about 200 times as high as that in the normal reproduction.

In such high-speed search, signals are searched at a very high speed such as a speed about 200 times as high as that in the normal reproduction, but the travelling speed of the magnetic tape itself is not so high.

In the R-DAT, the magnetic tape travelling speed in the normal reproduction mode is set at 8.15 mm/s, which is considerably low in comparison with 4.76 cm/s in a conventional analog cassette tape recorder. Since the magnetic tape travelling speed in the FF/REW (forward/rewind) mode is 30 times the speed in the normal mode in a conventional analog cassette tape recorder, if the magnetic tape is caused to travel at a similar same speed in the R-DAT, it is possible to cause the magnetic tape to travel at a speed about 200 times as high as that in the normal reproduction mode of the analog cassette tape recorder.

It is necessary to read out data indicating the beginning of the piece of music from the magnetic tape which is travelling at such a high speed.

In the R-DAT, the recording area on the magnetic tape is provided with a sub code area in which ID (S-ID) indicating the beginning of the music, and data W1, W2 indicating the program number (PNO) are recorded. These data are recorded in multiples in a plurality of blocks (8 blocks in both sub code areas 1 and 2) in order to enhance the accuracy of reading the data.

Parity data are attached to the data W1 and W2 in order to prevent an error in reading. In a conventional apparatus, the parity of the data W1, W2 is first checked and if the parity is identified, this pair of items of data is fetched. However, since the probability of causing an error is large if only one pair of items of data W1, W2 is fetched, it is not until two pairs of items of same data W1 and W2 are serially fetched that cue up or the like is executed.

High-speed search is classified into FF search (forward fast feeding) and REW search (rewinding) by the direction of travel of the tape. The direction of rotation of the head is the same in high-speed search at 200 times the speed as in the normal mode. In order to read data by a reading signal having the same frequency as in the normal mode, it is necessary to make the relative speed of the magnetic head and the tape surface toward the track the same.

According to a simple calculation, in the case of high-speed search at 200 times the speed in the normal mode, the head rotation speed, which is 2,000 rpm in the normal mode, must be set at about 3,000 rpm for FF search and about 1,000 rpm for REW search.

In this way, in high-speed search, the head rotation rate is varied between FF search and REW search. Therefore, the time required for the head to pass the sub area in the track for FF search is about ⅓ of the time for REW search. As shown in FIG. 4A, the trajectory of the head at the time of FF search is formed in the direction in which the track is crossed.

For this reason, the probability of accurate reading of data is sometimes greatly reduced at the time of FF search and the high-speed search function cannot be fully exhibited.

In addition, the R-DAT having such a high-speed search function is often inconvenient if a magnetic tape on which the start ID, which is sub code data indicating the beginning of a piece of music, is not recorded. As a counter measure, an R-DAT having a cue/review function which enables cue up while listening to reproduced sound has been developed.

In cue/review reproduction in a conventional R-DAT, however, since one item of the digital data read out of the two magnetic heads is adopted, an exterior circuit such as an envelope circuit for comparing the amplitudes is necessary, which disadvantageously makes the system structure complicated.

FIGS. 5A to 5F show the tracks which the two magnetic heads A, B (having a + azimuth and − azimuth, respectively) trace at the time of cue/review and the envelope waveforms of the signals reproduced at that time. In the case of reproducing the signals recorded in the tracks shown in FIG. 5A in the normal mode ($\times$1PB) by a head switching signal, since the magnetic heads A, B trace the +azimuth tracks and the − azimuth tracks so as to read digital data, as shown in FIG. 5B, in the envelope waveform of the reproduced signals, the amplitudes of the signals from the magnetic heads A, B are approximately the same, as shown in FIG. 5E. On the other hand, at the time of reproduction at double the speed ($\times$ 2PB), the magnetic head A traces the + azimuth tracks and the magnetic head B also traces the + azimuth tracks, as shown in FIG. 5C. Since it is impossible to read out digital data by the tracing of the +azimuth tracks by the magnetic head B, in the envelope waveform, the amplitude of the signal from the magnetic head A is large, while that from the magnetic head B is small. It is therefore necessary to select only the digital data from the magnetic head A by the envelope circuit for reproduction, which leads to a complicated system structure.

SUMMARY OF THE INVENTION

Accordingly, it is an object of the present invention to eliminate the above-described problems in the related art and to provide an R-DAT which is capable of high-speed search with high accuracy even during FF search.

It is another object of the present invention to provide an R-DAT having a cue/review function in a simple system structure which obviates an external circuit such as an envelope circuit.

To achieve this aim, an R-DAT provided in one aspect of the present invention is provided with a selecting means for selecting the code data having the largest number by comparing plural items of code data which are read out in a predetermined time and a switching means for switching the selecting means between the REW search for comparing the code data after determining whether the corresponding code data is supplied from a sub code area 1 or a sub code area 2 and the FF search function for comparing the code data without determining whether the code data is supplied from the sub code area 1 or the sub code area 2 in accordance with the input signal which indicates FF search or REW search.

The code data which are recorded on the magnetic tape are read out and the code data which are identified by the greatest majority are fetched as data. At the time of REW search whether the corresponding code data is supplied from the sub code area 1 or the sub code area 2 is determined before comparison, while at the time of FF search, no such discrimination is carried out. Since the judging method of the code data is different between FF search and REW search, it is possible to prevent misidentity caused when the code data from the sub code area 1 and the code data from the sub code data 2 are temporally too distant from each other for identification.

In addition, since such discrimination is not carried out at the time of FF search when the number of items of data obtained is small, a sufficient items of data is obtained for enhancing the accuracy of identification.

An R-DAT provided in another aspect of the present invention comprises: a parity calculating means for calculating the parity from the digital data which are alternately read out of a magnetic tape by first and second magnetic heads; a parity judging means for judging whether or not the calculated parity is identified with a preset parity; a counting means for counting the number of identified parities both of the digital data which are read out by the first magnetic head and of the digital data which are read out by the second magnetic head; a comparing means for comparing the numbers of the identified parities between the digital data which are read out by the first and second magnetic heads; a means for preventing the reproduction of the digital data which have a smaller number of identified parities by setting an error flag thereon; and a means for interpolating and reproducing the digital data which have a larger number of identified parities.

In the present invention, in place of selecting and adopting digital data by comparing the envelope waveforms of the digital data which are alternately read out by the first and second magnetic heads, the parities of the read data are detected and the data having the largest number of identified parities are adopted.

The parity judging means judges whether or not the parity $P'$ calculated by the parity calculating means is identified with the parity $P$ (the sum of $W1 + W2$ for each bit) which is preset at the time of recording. When digital data is read out of the magnetic tape by the magnetic head, if there is no reading error, the parity is identified, which means that the data read out at that time is correct. After digital data for two tracks of the magnetic tape are read out, the number of the identified parities are compared and an error flag is set on the digital data having a smaller number of identified parities, in other words, the digital data read out by the magnetic head having a lower accuracy, thereby preventing the reproduction of the digital data and interpolating and reproducing for cue/review the digital data having a larger number of identified parities, in other words, the digital data which are read out with accuracy.

The above and other objects, features and advantages of the present invention will become clear from the following description of the preferred embodiments thereof, taken in conjunction with the accompanying drawings.

BRIEF DESCRIPTION OF THE DRAWINGS

FIGS. 1, 2 and 3 are explanatory views of a magnetic tape with data being recorded;

FIGS. 4A and 4B are explanatory views of the trajectories of a magnetic tape produced during FF search and REW search;

FIGS. 5A to 5F show the trajectories of a magnetic head produced at the time of cue/review and the envelope waveforms of the signals reproduced at that time;

FIGS 6A and 6B are block diagrams of the entire structure of an embodiment of a digital audio tape recorder according to the present invention;

FIGS. 7, 7A and 7B are block diagrams of the structure of the main part of the embodiment shown in FIG. 6;

FIG. 9, 9A and 9B are block diagrams of the main structure of another embodiment.

DESCRIPTION OF THE PREFERRED EMBODIMENTS

Preferred embodiments of the present invention will be explained hereinunder with reference to the accompanying drawings.

FIRST EMBODIMENT

Figure 1:
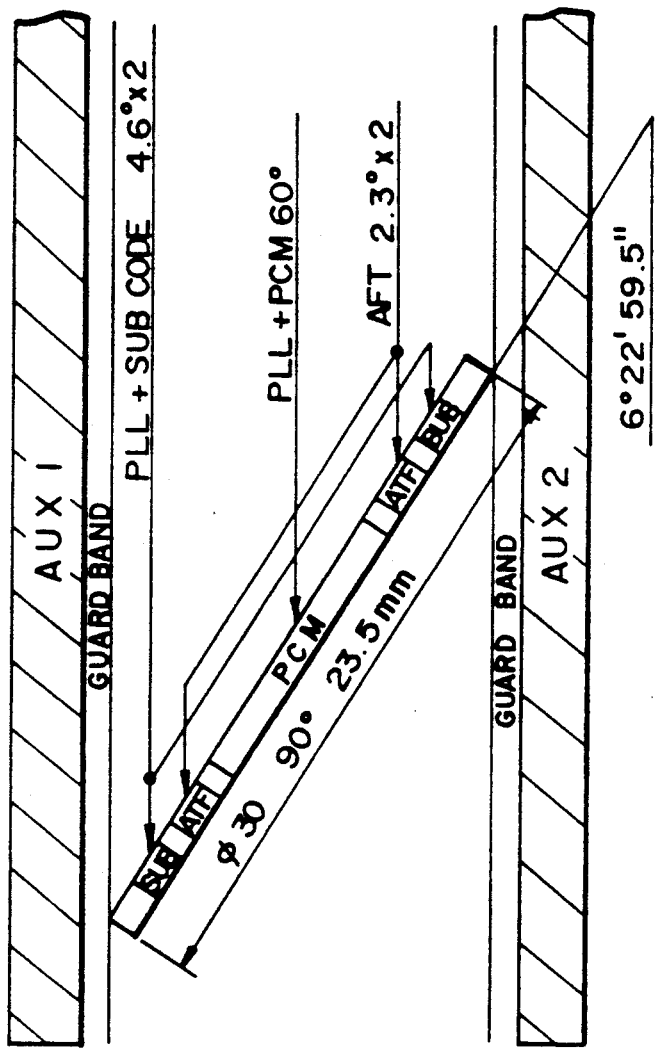
Figure 6B:
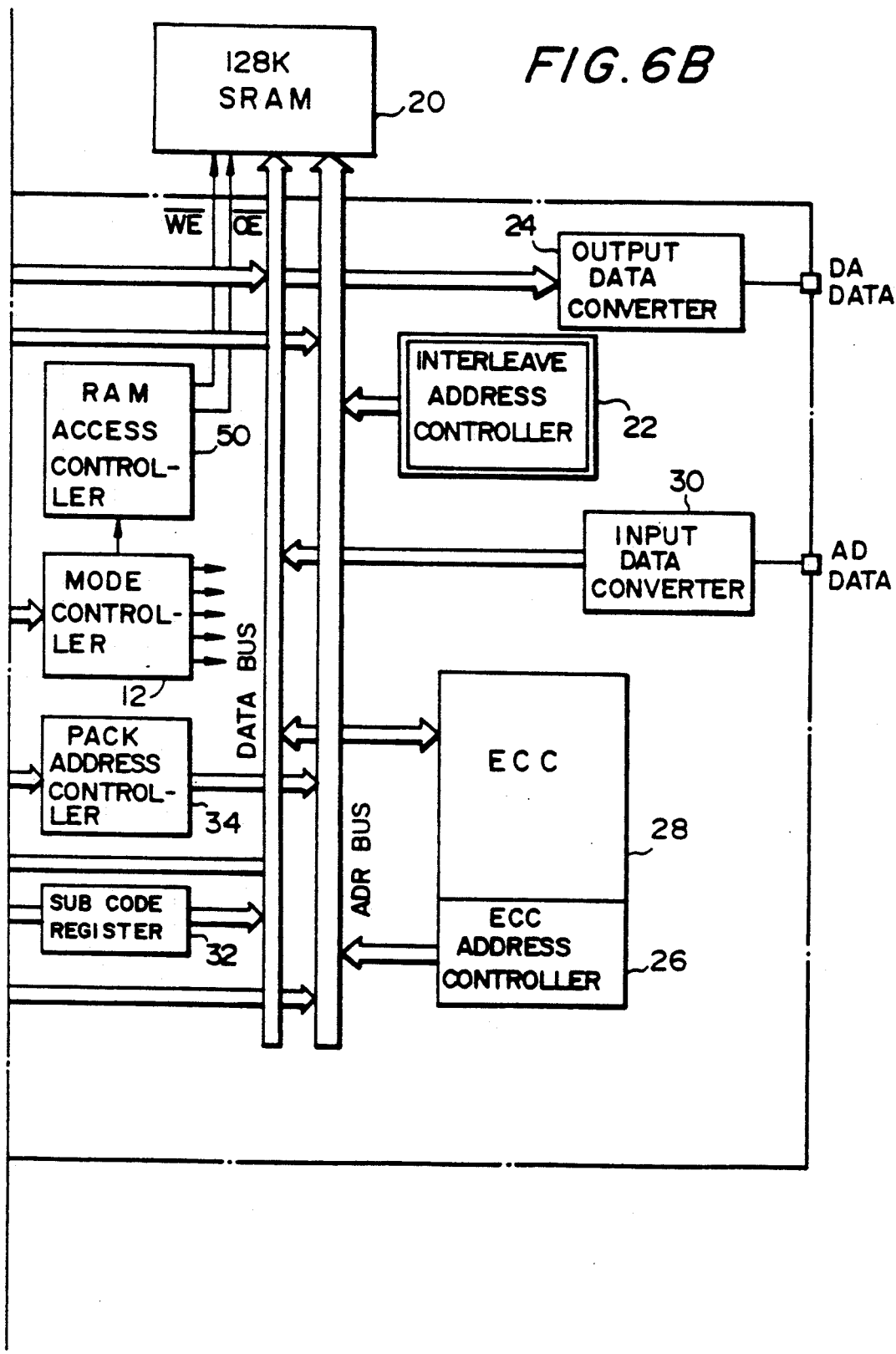

FIGS. 6A and 6B block diagrams (FIG. 6) show the entire structure of a first embodiment of the present invention. Control signal (mode data) is supplied from a CPU 10 to a mode controller 12 through a CIO data bus, and an output of the mode control circuit sets a mode such as reproduction, recording and high-speed search.

REPRODUCTION

In a normal reproduction mode, the drum is rotated at 2,000 rpm and digital data recorded on a magnetic tape is read out by two magnetic heads A and B. A synchronous clock is produced from the sync bit in the read-out data by a PLL circuit (not shown). The PCM data read out of a track in accordance with the synchronous clock is input to a demodulator 14.

The demodulator 14 detects the sync signal SYNC in the input PCM data block and resets a symbol counter 16 and also subjects the input PCM data to 10 - 8 bit conversion. The symbol counter 16 counts the synchronous clocks and counts ID code data W1, block address data W2, parity P and PCM data, namely, 35 symbols in total (1 symbol after 10 - 8 conversion consists of 8 bits), which are input after the sync signal SYNC.

When the count value of the symbol counter 16 is "2", in other words, when the input of the block address data W2 of the data block is detected, the 7 bits in the block address data W2 having 8 bits which are output from the demodulator 14 are set at bits $A_5$ to $A_{11}$ in an address counter 18.

The lower 5 bits $A_0$ to $A_4$ of the address counter 18 are counter outputs for counting the 32 symbols of the PCM data, while the upper two bits $A_{12}$ and $A_{13}$ are bits for outputting a head switching signal for the magnetic heads A and B and a ½ frequency division signal thereof. When the first symbol of the PCM data is input, the RAM 20 having 128 KB is accessed by the output of the address counter 18 and the PCM data symbol output from the demodulator 14 is written in the RAM 20.

While the data read out of the magnetic heads A, B are written into the half part of the RAM, namely, 64 KB, the other half part 64 KB is accessed at the sampling frequency by an interleave address controller 22, and the PCM data stored at the address which is designated by the interleave address controller 22 is supplied to an output data converter 24, which converts the PCM data of 8 bits into the data of 16 bits and supplies it to a D/A converter for reproduction.

At the time of normal reproduction, when a predetermined amount of PCM data is stored in the RAM 20, an ECC address controller 26 accesses the RAM 20 and supplies the PCM data to an ECC circuit 28. The ECC circuit checks a C1 code from the input data and writes again the corrected data into the RAM 20. When the data for one track, namely, all the data read out by either of the magnetic heads A and B is stored in the RAM 20, the ECC address controller 26 and the ECC circuit 28 check a C2 code so as to correct the data.

Recording

A control signal designating the recording mode and the sampling frequency is supplied from the CPU 10 to the mode controller 12, and the internal circuit is set at the recording mode. Data subjected to A/D conversion in accordance with the designated sampling frequency is input to an input data converter 30, which separates the data of 16 bits into data of 8 bits. The symbol which is converted into 8 bits is interleaved and written into the part of 62 KB of the RAM 20 by the interleave address controller 22.

The C1 codes and C2 codes are produced from the written symbol by the ECC circuit 28, and are stored again in a predetermined area of the RAM 20.

The CPU 10 outputs SUB code data which is recorded together with sound data to a SUB code register 32. The SUB code register 32 produces pack data including a parity on the basis of the stored SUB code data. A pack address controller 34 writes the thus-produced pack data into the area of 64 KB for storing the C1 and C2 codes of the RAM 20 which has finished writing data into the magnetic head. The EEC circuit 28 produces the C1 code from the written pack data and it is stored again in the RAM 20.

In order to output the data written in the RAM 20 to the magnetic heads A, B, the address of the RAM 20 is first designated by a symbol counter 36, a block counter 38 and a frame counter 40 or counting written clocks FCH which are synchronous with the rotation of the rotary drum.

The data stored in the designated address is input to a modulator 44 through a switching circuit 42 and supplied to the magnetic heads A and B after 8 - 10 bit conversion.

A W1, W2 parity generating data register 46 stores the sub code data (W1, W2 9P) produced by the CPU 10 and supplies them to the switching circuit at a predetermined timing.

A W1, W2 detector 48 checks the parity of the read sub code data W1, W2 on the basis of P and fetches the data having the identified parity. Among the fetched data, the data which are identified by the greatest majority are supplied to the CPU 10.

The switching between the writing and reading into and from the RAM 20 with a change in the mode such as the reproduction mode and the recording mode are executed in accordance with the access control signal from a RAM access controller 50.

Detection of W1, W2

Figure 7B:
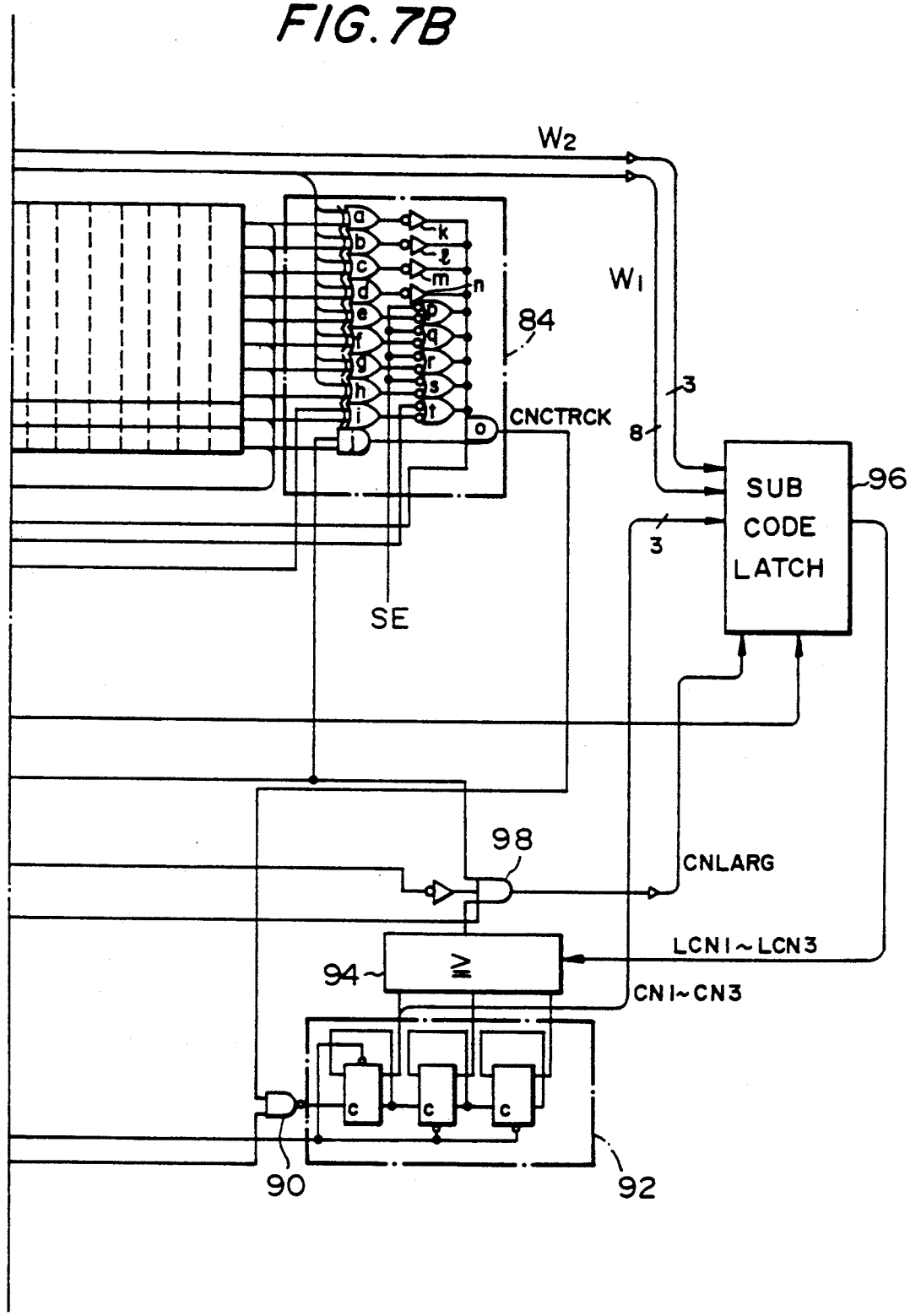
Figure 8:
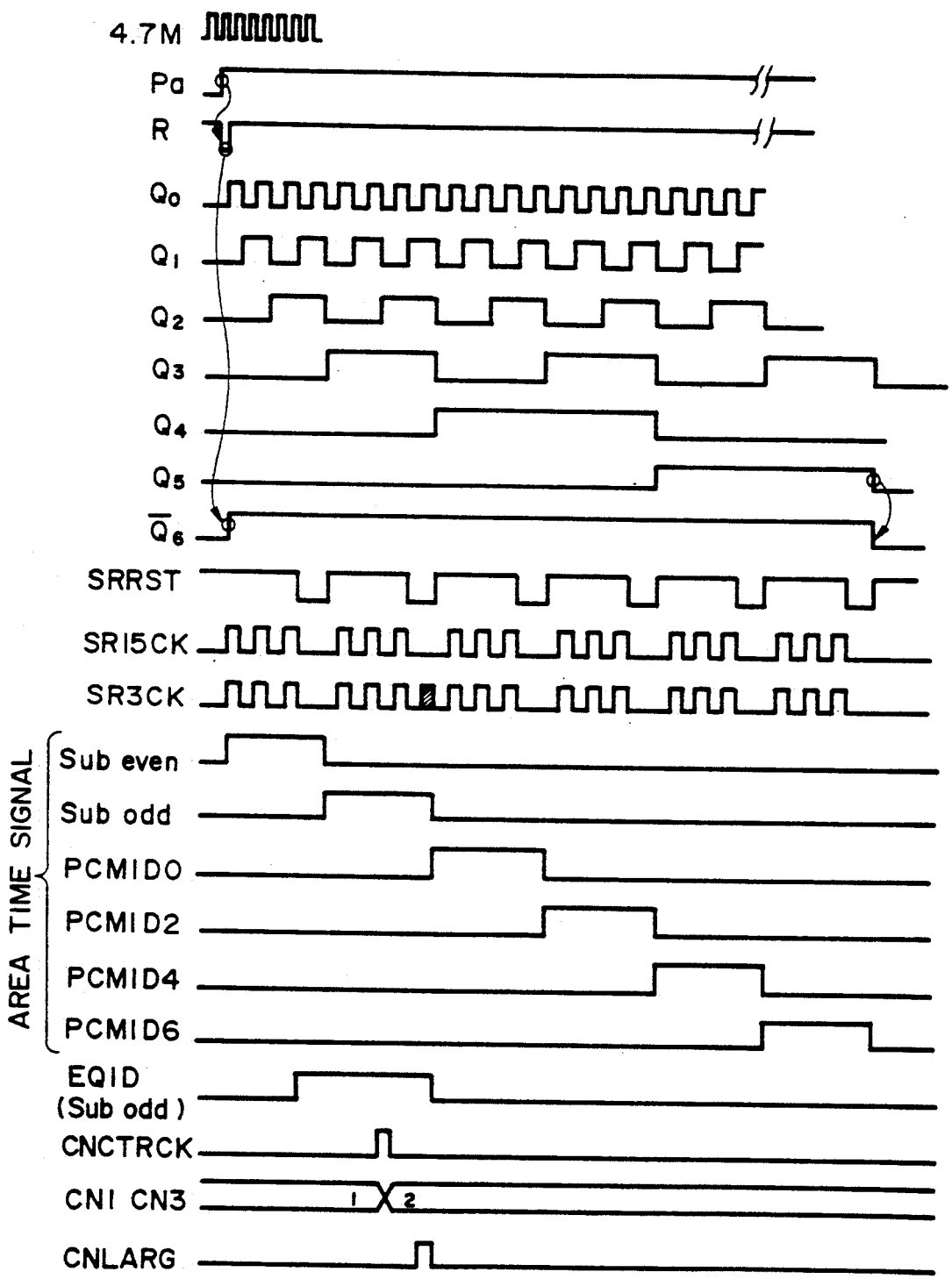
FIG. 8 is a timing chart of the embodiment shown in FIG. 6.

In the present invention, the sub code data W1, W2 are detected with high accuracy by the W1, W2 detector while discriminating the function between FF search and REW search at the time of high-speed search. The structure of the W1, W2 detector 48 will be explained with reference to the timing charts of FIGS. 7A and 7B (FIG. 7) and 8.

The W1, W2 detector 48 fetches the sub code data such as W1, W2 which are read out of the magnetic tape and checks the parity of W1, W2. The parity is a simple parity of W1 +W2 and the checking operation can be carried out by a simple comparator or the like. An example of such a comparing circuit will be described later. If the parity is identified, the data W1 and W2 are temporarily fetched as correct data, which are subjected to judgement as to the greatest majority in the identified parities.

For this purpose, a parity signal Pa which becomes [H] when a parity is identified is input to temporary storage flip-flops 60, 62 as a clock. With the rise of the parity signal Pa, the temporary storage flip-flops 60, 62 fetch and latch the data W1, W2, respectively.

The parity signal Pa is also input to a rise detector 64. The rise detector is composed of two flip-flops 64a, 64b connected in series with each other and a NAND gate 64c, and the Q-output terminal of the flip-flop 64a is connected to the input terminal of the flip-flop 64b and the Q-output terminal the flip-flop 64a and the $\overline{Q}$-output terminal of the flip-flop 64b are connected to the NAND gate 64c. A clock of 4.7 MHz is also input to the flip-flops 64a and 64b as a shift clock therefor. When the parity signal Pa is input to the input terminal of the flip-flop 64a and the input parity signal Pa becomes [H], a reset signal R which becomes [L] in the interval between the shift flocks is output from the NAND gate 64c.

The reset signal R is input to a timing generator 66 and resets each of the flip-flops 66b to 66h of the timing generator 66. Consequently, the timing generator 66 starts the operation from the initial state every time a parity is identified.

The timing generator 66 is composed of one NAND gate 66a and the seven flip-flops 66b to 66h.

The flip-flops 66b to 66d constitute frequency dividers, the flip-flops 66e to 66g ID counters and the flip-flop 66h a check end detector.

Each of the flip-flops 66b to 66h is set at 0 by the reset signal R at the time of the rise of the parity signal Pa. The output $\overline{Q6}$ of the flip-flop 66h which constitutes the check end detector is set at [H] by the rise of the parity signal Pa.

The output $\overline{Q7}$ of the flip-flop 66h and a clock signal of 4.7 MHz are input to the NAND gate 66a. The NAND gate 66a outputs a clock signal which is generated by simply inverting the clock signal of 4.7 MHz after the rise of the parity signal P.

The clock signal of 4.7 MHz output from the NAND gate 66a is input as a clock of the flip-flop 66b. Since the Q-output terminals and the input terminals of the flip-flops 66b, 66c and 66d are connected with each other, output signals Q0, Q1 and Q2 which are generated by dividing the frequency of the signal of 4.7 MHz are output from the output terminals of the flip-flops 66b, 66c and 66d, respectively.

Since the signal Q2 is input to the flip-flop 66e constituting an ID counter with the $\overline{Q}$-output terminal and the input terminal thereof connected with each other, the frequency of the signal Q2 is divided in another stage, thereby generating a signal Q3. Since the output Q3 is input to the flip-flops 66f, 66g as a clock, the output Q4 of the flip-flop 66f is a signal produced by dividing the frequency of the output Q3 in another stage and the output Q5 of the flip-flop 66g is a signal produced by shifting the output Q4 by another shift.

The output Q5 of the flip-flop 66g is input to the flip-flop 66h which constitutes the check end detector as a clock. Since the input terminal and the $\overline{Q}$-output terminal of the flip-flop 66h are connected with each other, the output $\overline{Q6}$ becomes [L] with the rise of $\overline{Q5}$, thereby the end of the checking operation is detected.

Since the output $\overline{Q6}$ of the flip-flop 66h is input to the NAND gate 66a, as described above, the pulse outputting operation from the NAND gate 66a is inhibited when the output $\overline{Q6}$ is [L], whereby the operations of the flip-flops 66b to 66h are finished.

All the outputs of the timing generator 66 are output to a signal generator 68. The signal generator 68 is provided with a W2 decoder 68a to which the W2 data from the temporary storage flip-flop 62 is input.

W2 data includes data which indicates from which area are supplied the current sub codes W1, W2 latched in the temporary storage flip-flops 60, 62. The W2 decoder decodes the data and outputs one of area signals (Sub 1 even, Sub 1 odd, Sub 2 even, Sub 2 odd, PCMID 0, PCMID 2, PCMID 4, PCMID 6) at a level of [H].

The area signal is input to an identity detector 68b. the output from an ID decoder 68c is input to the identity detector 68b and the identity detector 68b outputs a signal EQID when the area signal from the W2 decoder agrees with the output of the ID decoder 68c. In other words, the ID decoder 68c decodes the outputs of the ID counters 66e to 66g and outputs area time signals with the respective phases shifted in accordance with the outputs [0] to [5] of the ID counters 66e to 66g.

The identity detector 68b has eight AND gates and the area signals Sub 1 even, Sub 1 odd, Sub 2 even, Sub 2 odd, PCMID 0, PCMID 2, PCMID 4, PCMID 6 are input to the respective AND gates, and 6 different area time signals with the phases shifted in series which are output from the ID decoder 68c are input to 6 AND gates to which the area signals Sub 1 even and Sub 1 odd, Sub 2 even and Sub 2 odd, PCMID 0, PCMID 2, PCMID 4, PCMID 6 are input, respectively.

The reason why the number of area time signals is six is that the positions of the sub code area 1 and the sub code area 2 on the magnetic tape are distant from each other, so that discrimination between them is unnecessary.

The outputs of Q1, Q2 of the flip-flops 66c, 66d which constitute frequency dividers in the pulse generator 66 are input to a NOR gate 68d. A signal SRRST which is [L] while both the outputs Q1 and Q2 are [H] is output from the NOR gate 68d.

The output $\overline{Q0}$ of the flip-flop 62b, the output $\overline{Q7}$ of the flip-flop 62h and the signal SRRST are input to an AND gate 68e from the pulse generator 66. From the AND gate 68e, a signal SR15CK which is produced by removing the fourth signal from the output Q0 is output until the end of the checking operation.

The signal EQID is input to an AND gate 68g through an OR gate 68f. The signal SRRST is also input to the OR gate 68f. The output $\overline{Q2}$ of the flip-flop 66b and the output $\overline{Q}$ of the flip-flop 68h of the pulse generator 66 are also input to the AND gate 68g. Therefore, when the signal EQID is [L], the fourth pulse is removed from the output Q0, while when the signal EQID is [H], the fourth pulse is generated. Consequently, when the signal EQID is [H], a signal SR3CK which has one more pulses than the signal SR15CK is output (Sub odd area is shown in FIG. 3).

The W1 data is latched in the W1 temporary storage flip-flop 60 is latched when the parity is identified, as described above. The output terminal of the W1 temporary storage flip-flop 60 is connected to a three-stage memory 72 and a fifteen-stage memory 74 through a selecting circuit 70.

The signal SRRST is supplied to the selecting signal as a switching signal and while the signal SRRST is [H], the output terminal of the fifteen-stage memory 74 and the input terminal of the three-stage memory 72. On the other hand, while the signal SRRST is [L], the W1 temporary storage flip-flop 60 is connected to the input terminal of the three-stage memory 72.

The signal SR3CK is input to the three-stage memory 72 as a shift clock, and the signal SR15CK is input to the fifteen-stage memory 74 as a shift clock. Therefore, when both of the signals SR3CK and SR15CK output three pulses, the outputs of the fifteen-stage memory 74 are serially input to the three-stage memory 72, whereby every group of three items of stored data is shifted and circulated in series.

On the other hand, when the signal EQID is [H] and the fourth pulse is output as the signal SR3CK, the signal SRRST is [L] while this pulse is output, so that the data stored in the W1 temporary storage flip-flop 60 is fetched in the three-stage memory 72. At this time, since the signal SRRST has no corresponding pulse, the fifteen-stage memory 74 does not fetch the data, so that the data stored in the third stage of the three-stage memory 72 is discarded.

In this way, the three-stage memory 72 fetches the W1 data only when the signal EQID is [H]. The timing for fetching the W1 data is regulated by the signal EQID, and the timing for the signal EQID in turn is regulated by the area signal.

W1 data from each area is constantly fetched to the three-stage memory 72 at the same timing. If it is assumed that not less than three items of data are input from each area, three items of W1 data from each area are arranged in the order of Sub even, Sub odd, PCMID 0, PCMID 2, PCMID 4 and PCMID 6 in the three-stage memory 72 and the fifteen-stage memory 74. If not less than four signals for the same area are input, the old data is discarded.

The W1 data is 8-bit data, and the output of the W1 temporary storage flip-flop 60 is 8 bits, while 9 bits are allotted to the selecting circuit 70 and 10 bits to each of the three-stage memory 72 and the fifteen-stage memory 74.

To the lowest bit of the selecting circuit 70 is input the output of the fourth bit (bit 3) of the W2 temporary storage flip-flop 62 which indicates the discrimination between Sub 1 and Sub 2, and one of the outputs of the fifteen-stage memory 74 is selected. If the three-stage memory 72 stored new data, the output value of an AND gate 80 is written into the lowest second bit thereof.

The output of the fifteen-stage memory 74 and a signal obtained by inverting the signal SRRST are connected to the lowest bits of the three-stage memory 72 and the fifteen-stage memory 74 through an OR gate 82. Therefore, when data is fetched to the three-stage memory 72, the lowest bit becomes [1] and in the other cases, the lowest bit becomes [0].

The output of the fifteen-stage memory 74 is input to a comparator 84. The comparator 84 is composed of nine EX-OR gates 84a to 84i, one AND gate 84j, four inverters 84k to 84n, five NAND gates 84p to 84t and one AND gated 84o. The output of the fifteen-stage memory 74 is input to the EX-OR gates 84a to 84i and the AND gate 84j.

The output (W1 data) of the flip-flop 60 which corresponds to the output of the fifteen-stage memory 74 are input to eight EX-OR gates 84a to 84h. If two items of data are the same, [L] is output. The output of the AND gate 80 is input to the EX-OR gate 84i to which the lowest second bit of the fifteen-stage memory 74 is input, and when the current output of the AND gate and the output of the fifteen-stage memory 74 agree with each other, [H] is output.

The output terminals of the EX OR gates 84a to 84d are connected to the AND gate 84o through the inverters 84k to 84n. Therefore, when the data input to the EX-OR gates agree with each other, [H] is output to the AND gate 84o.

The EX-OR gates 84e to 84i are connected to the AND gate 84o through the NAND gates 84p to 84s, and a search signal SE is input to the input terminals of the NOR gates 84p to 84s. Each of the NAND gates 84p to 84s outputs [H] of the input signal agrees with the output signal of any of the EX-OR gates 84e to 84h when the search signal SE is [H]. When the search signal SE is [L], each of the NOR gates 84p to 84s outputs [H] irrespective of the outputs of the EX-OR gates 84e to 84h.

The output of the EX-OR gate 84i is connected to the AND gate 84o through the NAND gate 84t. The data of seventh bit of the W2 data is input to the other input terminal of the NAND gate 84t. When the data is [0], the NAND gate 84t outputs [H].

The data of bit 7 of the W2 data is a signal which becomes [0] when the data is PCM data and [1] when the data is sub code data. In the case of PCM data, the NAND gate 84t outputs [H].

During high-speed search, the signal SE is [L]. Therefore, the data for 4 bits (bit 0 to 3) of the W1 data is not compared. This is because the four bits of 0 to third bits of the W1 data is a signal within the frame and since the tracks are not traced during high-speed search, the data in different frames must be compared.

In this embodiment, the output of the AND gate 80 is input to the EX-OR gate 84i. The data of the fourth bit (bit 3) of the W2 data and a signal J are also input to the AND gate 80. The signal J becomes [L] during FF search and [H] in the other cases (e.g., REW search). The data of the fourth bit (bit 3) of the W2 data is a signal indicating the discrimination between the sub area 1 and the sub area 2.

Therefore, in the case of FF search, data are compared by the comparator 84 without the need for judging whether they are supplied from the sub area 1 or the sub area 2.

In the case of PCM data, since there is no discrimination between the sub area 1 and the sub area 2, the output is held at [H] by the NAND gate 84t.

The output of the fifteen-stage memory 74 and the signal EQID are input to the NAND gate 84j. Therefore, [H] is output from the AND gate 84j only when the signal EQID is [H] and the output of the fifteen-stage memory 74 is [H]. In other words, only when the data output from the fifteen-stage memory 74 belong to the same area as the data which is fetched in the WI temporary storage flip-flop 60, the AND gate 84j outputs [H].

During the period when the signal EQID is [H], since the signal SR15CK outputs three pulses, the comparator 84 compares three items of W1 data output from the fifteen-stage memory 74.

If all the inputs of the AND gate 84o are [H] as a result of comparison, the AND gate 84o outputs the pulse of [H].

The output CNCTRCK of the AND gate 84o which shows the result of the comparison is input to a CN counter 92 through a NAND gate 90. The CN counter 92 for serially counting up the outputs CNCTRCK is composed of three flip-flops 92a to 92c and outputs CN1 to CN3. Each of the flip-flops 92a to 92c is risen and reset by the reset signal R from the rise detector 64 in the same way as each of the flip-flops 66b to 66h of the pulse generator 66. When the parity of the W1 data and W2 data is identified, the CN counter 92 is reset and the initial value thereof is set at [001]. When one pulse is input from the signal CNCTRCK, each of the outputs CN1 to CN3 becomes [2], and when three pulses are input, each of them becomes [4].

The outputs CN1 to CN3 of the CN counter 92 are input to a comparator 94 and compared with the count values LCN1 to LCN3 which are supplied from a sub code latch circuit 96. The sub code latch circuit 96 is provided with a plurality of latches for holding the W1 data and the count value from the CN counter 92 for each area. When the output of the W2 decoder 68a is supplied to the sub code latch circuit 96, the W1 data, the W2 data of 3 bits and the count value are held in the sub code latch circuit 96 in accordance with the output signal, as will be described later. The count value is read out from each area and supplied to the comparator 94. The comparator 94 outputs [H] when the output of the CN counter 92 is larger than the data from the sub code latch circuit 96, and the signal [H] is input to an AND gate 98. To the AND gate 98 are also input the signals EQID and SRRST in the inverted state and the check end signal. Consequently, during the checking period, when the output of the comparator 94 is [H] and the signal EQID is [H], a signal CNLARG which is [H] while the signal SRRST is [L] is output.

The signal CNLARG is a signal for fetching the data from the sub code latch circuit 96. The data of the upper 8 bits (bits 0 to 7) of the W1 temporary storage flip-flop 60, the data of 3 bits (bits 4 to 6) of the W2 temporary storage flip-flop 62 and the data of 3 bits output from the CN counter 92 are input to the sub code latch circuit 96. Therefore, the data on the number of times the W1 data has been input is stored in the sub code latch circuit 96.

The sub code such as W1 and W2 is detected for each item of data read out by one magnetic head, namely, each item of data read out of one track. For this purpose, when the head switching signal is output, the three-stage memory 72, the fifteen-stage memory 74, the sub code latch circuit 96 and the like are set at the initial stage [0].

For example, in high-speed search, when the parity of the sub codes W1, W2 is first identified, the checking operation is initiated. At this time, the W1 data and W2 data are latched in the temporary storage flip-flops 62 and 64, respectively. If the latched data are output from the Sub odd area, the signal EQID is [H] while the area time signal is Sub odd (second time) and a fourth pulse is output as the signal SR3CK, whereby the W1 data latched in the W1 temporary storage flip-flop 62 is fetched to the three-stage memory 72.

On the other hand, while the three pulses precedent to the fourth pulse are output, since the signal EQID is [H], comparison between the data from the W1 temporary storage flip-flop 62 and the data from the final stage of the fifteen-stage memory 74 is executed three times by the comparator 84. However, since no data is stored in the fifteen-stage memory 74, the data is not identified. Therefore, no pulse is output as the signal CNCTRCK, and the CN counter remains in the initial state [1].

On the other hand, since the data in the sub code latch circuit 96 remains in the initial state, the comparator 94 outputs [H], and sub codes W1, W2 and the count value [1] are stored in the sub code latch circuit 96.

When the parity is identified next time, the sub codes W1, W2 are fetched and compared in the same way. If the sub codes are output from the same area (Sub odd area), the signal EQID becomes H at the same timing, and after three cycles of comparisons of the data by the comparator 4, they are fetched to the three-stage memory 72. In this process, the data stored in the fifteen-stage memory 74 in the previous process is output and compared with the current W1 data. If the data agree with each other, a pulse is output as the signal CNCTRCK, as shown in FIG. 3. The count value of the CN counter 92 increases to [2]. The pulse CNLARG is output from the comparator 94, whereby the W1 data and W2 data are fetched together with the value [2] of the CN counter 92 to the sub code latch circuit 96.

In this way, the W1 data with the identified parities are stored in the corresponding areas and compared in the respective areas. The sub code data on the data which are identified by the greatest majority is stored in the sub code latch circuit 96.

Depending upon whether the signal J is [H] or [L], the necessity of judgment as to whether the data are supplied from the sub area 1 or the sub area 2 before comparison is determined. At the time of FF search, the data are compared without such discrimination, while at the time of REW search, they are compared after the discrimination. Thus, the detection of sub code with high accuracy is achieved.

As described above, according to the first embodiment, the code data is selected after judgement is made as to whether it is supplied from the sub area 1 or the sub area 2 at the time of REW search, but such discrimination is unnecessary at the time of FF search.

Therefore, at the time of REW search, by discriminating between the code data from the sub code area 1 and the code data from the sub code area 2, it is possible to prevent misidentity caused when the code data from the sub code area 1 and the code data from the sub code area 2 are temporally too distant from each other for identification. At the time of FF search, since such discrimination is not carried out, it is possible to obtain a sufficient number of items of data and thereby enhance the accuracy in the detection of the sub code.

SECOND EMBODIMENT

Figure 9:
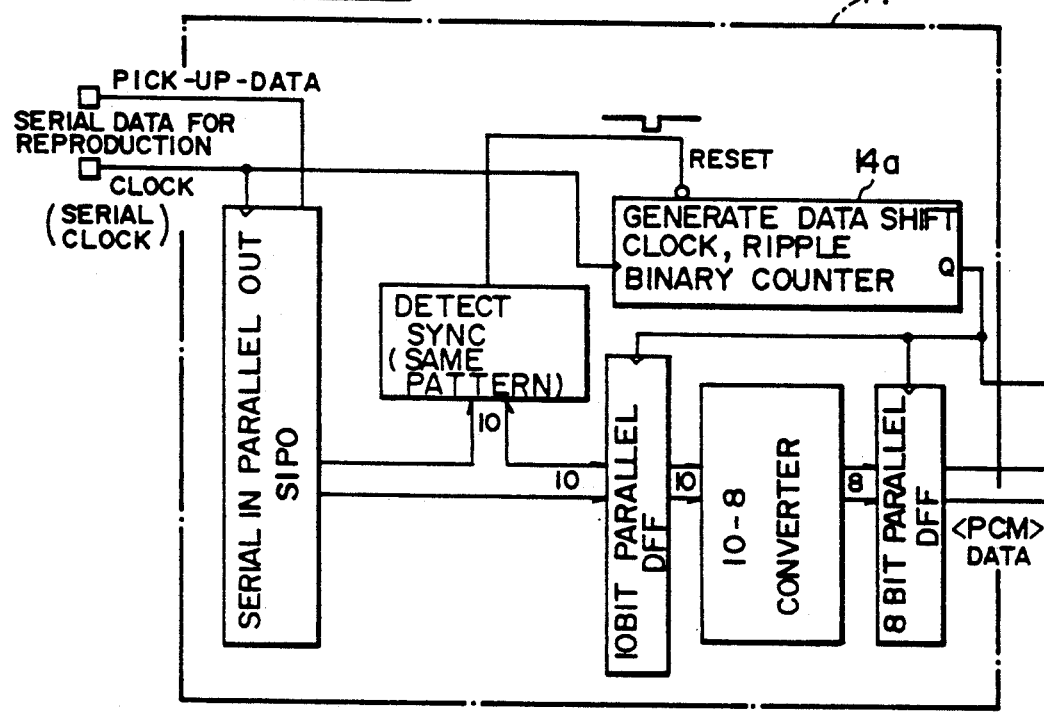
Figure 9A:
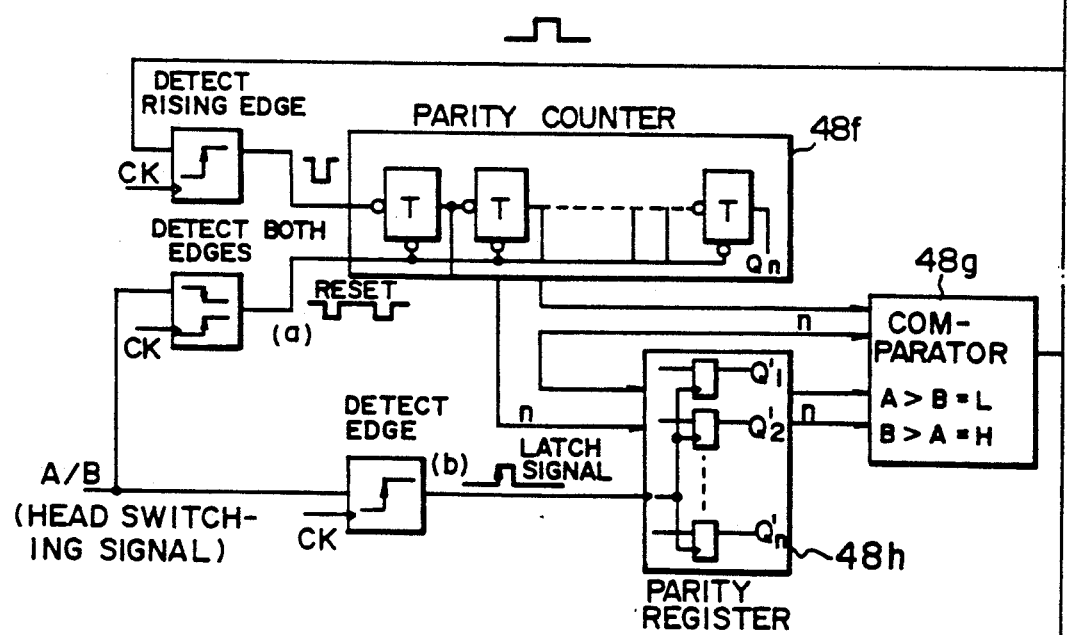

The W1, W2 detector 48 will now be explained in detail with reference to FIG. 9. FIGS. 9A and 9B are a circuit diagram of the W1, W2 detector 48. Among the PCM data which are subjected to 10 - 8 conversion by the demodulator 14, the ID code data W1 of 8 bits, the block address data W2 of 8 bits, the parity P of 8 bits are held by a W1 register 48a, W2 register 48b and a P register 48c, respectively. To state this more concretely, each of the registers is composed of a D-type flip-flop DFF and a count-up signal is input every 8 bits from a binary counter 14a to the clock terminal of the D-type flip-flop DFF, whereby the W1 data, the W2 data and the parity P are serially input to the subsequent registers. As a result, the W1 data is held by the W1 register 48a in the final stage, the W2 date is held by the W2 register 48b in the center stage and the P data is held by the P register 48c in the first stage. On the other hand, the PCM data is stored in the address of the RAM 20 designated by the address counter 18, as described above W1 data held by the W1 register 48a and the W2 data held by the W2 register 48b are further supplied to a parity calculator 48d, which calculates the parity P' from these data as follows:

P'=W1+W2 (sum of W1 and W2 for each bit). The parity calculator 48d is composed of 8 EX-OR gates, and the W1 data and W2 data each for 1 bit are input to the input terminal of each EX-OR gate. The EX-OR gate is a logic gate which outputs [0] when all the inputs are equal and [1] when they are different, as is well known. The parity P' calculated from the W1 data and W2 data in this way is output to a parity judging circuit 48e.

The parity of 8 bits which is held by the P register 48c is also output to the parity judging circuit 48e. The parity judging circuit 48e judges whether or not the parity P' calculated by the parity calculator 48d is identified with the parity P. The parity judging circuit 48e is composed of 8 EX-OR gates each having an inversion output and an AND gate. The parities P and P' are input to the two input terminals of each EX-OR gate. The parity judging circuit 48e therefore outputs [11111111] when the parities P and P' are identified with each other and a value other than this when they are different. The data of 8 bits are output through the AND gate, so that [1] is output when P is P' and [0] is output in the other cases.

The output from the parity judging circuit 48e, namely, the parity identity signal is input to a parity counter 48f after the rising edge thereof is detected. The parity counter 48f for counting the number of identified parities is composed of an 8-bit binary counter consisting of eight T-type flip-flops TFT and counts outputs [1], namely, H-level signals which are input after it is reset by both rising edge and falling edges of the head switching signal (e.g., a signal having a duty ratio of 50% which falls to an L level while the head A is reading and rises to an H level while the head B is reading) of the upper two bits $A_{12}$ and $A_{13}$ of the address counter 18. Therefore, the parity counter 48f counts the number of parities which are identified by the parity judging circuit 48e for each of the magnetic head A B. The result of counting is output to a comparator 48g and a parity register 48h.

Since a latch signal is input to the clock terminal of the parity register 48h at the rising edge of the head switching signal, namely, when the head A is switched over to the head B, the parity register 48h outputs the number of identified parities of the data read out by the magnetic head A to the comparator 48g. In this way, the number of identified parities of the data read out by the magnetic head A and the number of identified parities of the data read out by the magnetic head B are alternately input to the comparator 48g for every one frame (corresponding to two tracks). The comparator 48g compares the numbers and if A> B, namely, if the number of identified parities of the data read out by the magnetic head A is larger than the number of identified parities of the data read out by the magnetic head B, [L] is output to a controller 51, while if B>A, namely, the number of identified parities of the data read out by the magnetic head B is larger than the number of identified parities of the data read out by the magnetic head A, [H] is output to a controller 51. The controller 51 is composed of an EX-OR gate 51a for inputting the output of the comparator 48g, an AND gate 51b for inputting the output of the EX-OR gate 51a and an OR gate 51c for inputting the output of the AND gate 51b. To the other input terminal of the EX-OR gate 51a is input the head switching signal.

As described above, when the head switching signal is [L], the magnetic head A is selected, while when the head switching signal is [H], the magnetic head B is selected. The EX-OR gate 51a outputs [H] when the comparator 48g outputs [L] because the result of comparison is A>B and when the magnetic head B is selected. When the comparator 48g outputs [H] because the result of comparison is B>A and when the magnetic head A is selected, the EX-OR gate 51a also outputs [H]. In other words, with respect to the data which have a small number of identified parities and are not used as reproduced data, [H] is output one frame behind in correspondence with the current head switching signal.

The output of the EX-OR gate 51a is input to the AND gate 51b. Since a cue/review mode signal is input from the mode controller 12 to the other input terminal of the AND gate 51b, the EX-OR gate 51a outputs [H] when the mode is [H] indicating the cue/review mode and the output of the EX-OR gate 51a is [H]. The output of the AND gate 51b is input to the OR gate 51c and output to the output data converter 24 as an error flag signal.

The PCM data for one frame is stored in the half part of the RAM 20, namely, 64 KB and simultaneously the PCM data for the previous one frame which is stored in the other half part of 64 KB is read out by the interleave controller 22 and input to the output data converter 24, as described above. At this time, an error flag is forcibly set on the data read out by the magnetic head A or B and judged to be an error on the basis of an error flag signal output from the controller 51. The output data converter 24 adopts only the correct data without any error flag set thereon and interpolates the data by an average value before reproduction. The data adopted at this time is data read out by either of the magnetic heads A and B, but since the PCM data is recorded in the interleave format, it is possible to reproduce the original signal. That is, the data of even numbers of an L channel and the odd numbers of an R channel are recorded in one track, as shown in FIG. 4 Therefore, in the case of reproducing the sound of the L channel, for example, even if an error flag is set on the data of an odd number, since the data of the odd numbers before and after the odd number are correct PCM data, interpolation by an average value from the precedent data $L_{2n}$ and the subsequent data $L_{2(n+1)}$ (n=0, 1, 2 . . . ) is possible as follows:

$$L_{2n+1}=(L_{2n}+L_{2(n+1)})/2$$

In this way, in this embodiment, the magnetic head to be adopted is selected on the basis of the parity check and a cue/review function is enabled in a simple structure without the need for an external circuit such as an envelope circuit.

As described above, according to a DAT having a cue/review function of the second embodiment, it is possible to execute the cue/review function in a simple structure and to enhance the reliability of the DAT.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A searching apparatus of a digital audio tape recorder for taking out information by a plurality of rotary magnetic heads int he state in which a magnetic tape with digital data recorded thereon is travelling at a speed higher then the normal speed, said searching apparatus comprising:
   a parity detecting means for detecting the parity of said digital data read out by said rotary magnetic heads, including:
   a judging means for judging whether or not said parity of said digital data which are read out by said plurality of rotary magnetic heads while tracing tracks on said magnetic tape in the state in which said magnetic tape is travelling at a high speed in the forward or backward direction is identified with a preset parity;
   a counting means for counting the number of identified parities of said digital data for each of said plurality of rotary magnetic heads; and
   a comparing means for comparing the numbers of identified parities between the digital data read out by said plurality of rotary magnetic heads;
   a processing means for processing said digital data in accordance with the result of the detection by said parity detecting means, including a digital data selecting means for judging the digital data to have a lower reliability, said digital data being read out by the rotary magnetic head which is proved by said comparing means to have supplied the digital data having a smaller number of identified parities.

2. A searching apparatus according to claim 1, wherein said processing means further includes:
   a preventing means for preventing the reproduction of said data read out by said rotary magnetic head which has supplied the digital data having a smaller number of identified parities on the basis of the output of said digital data selecting means; and
   a digital data interpolating and reproducing means for interpolating the digital data read out by the rotary magnetic head which has supplied the digital data having a larger number of identified parities with the digital data which has not been selected on the basis of the output of said digital data selecting means.

3. A searching apparatus according to claim 2, wherein said parity detecting means includes a parity calculating means for calculating a parity from digital code data W1 and digital block address data W2 which are included by said digital data in accordance with the formula W1+W2 and detecting the identity of said parity with parity data which is included in said digital data.

4. A searching apparatus according to claim 2, wherein said preventing means prevents said reproduction by setting an error flag on said digital data read out by said rotary magnetic head which has supplied the digital data having a smaller number of identified parities.

5. A searching apparatus, of a digital audio tape recorder for taking out information by a plurality of rotary magnetic heads in the state in which a magnetic tape with digital data recorded thereon is travelling at a speed higher then the normal speed, said searching apparatus comprising:
   a parity detecting means for detecting the parity of said digital data read out by said rotary magnetic heads, including:
   a parity judging means for judging whether or not the parity of the digital data read out by said plurality of rotary magnetic heads while tracing across a plurality of tracks on said magnetic tape in the state in which said magnetic tape is travelling at a high speed in the forward or backward direction is identified with a preset parity; and
   a processing means for processing said digital data in accordance with the result of the detection by said parity detecting means, including:
   a storing means for storing said digital data every time said parity is identified;
   a comparing means for detecting the identity of the current digital data with the digital data stored in said storing means every time a new parity is identified;
   a counting means for counting the number of items of identified digital data detected by said comparing means; and
   a selecting means for selecting the greatest number of items of identified digital data obtained by said counting means so as to obtain the recording information of said magnetic tape which is travelling at a high speed on the basis of said digital data selected by said selecting means.

6. A searching apparatus according to claim 5, wherein
   said storing means stores said digital data for each designated area in each of said tracks on said magnetic tape;
   said processing means includes an area detecting means for detecting said area in which said digital data is recorded on the basis of a part of said digital data with the identified parity thereof detected; and
   said comparing means compares the current data with said digital data in said area of said storing means which is detected by said area detecting means.

7. A searching apparatus according to claim 6, wherein said selecting means includes:
   a latching means for holding digital data and the count value of said counting means in each area which is detected by said area detecting means; and
   a maximum value detecting means for comparing said count value held by said latching means with said count value of said counting means in each area and rewriting said digital data and said count value in the corresponding area when said count value of said counting means is larger than said count value held by said latching means, thereby selecting in each area the greatest number of items of identified digital data detected by said comparing means.

8. A searching apparatus according to claim 7, wherein
   said storing means is provided with an area discriminating region for identifying the area of each of said track in which said digital data stored in said storing means is recorded; and said processing means further includes an area discrimination judging means for judging whether or not identification code data is to be stored in said area discriminating region.

9. A searching apparatus according to claim 8, wherein
said area discriminating region is composed of areas corresponding to a sub code area 1 and a sub code area 2 provided on said magnetic tape;
said area discrimination judging means is controlled by a signal which indicates whether said magnetic tape is travelling at a high speed in the forward direction (FF search) or in the backward direction (REW search); and
said identification code data is not stored in said area discriminating region at the time of said FF search, whereby said comparing means compares said digital data without discriminating between said sub code area 1 and said sub code area 2.

10. A searching apparatus according to claim 7, wherein
said parity judging means includes a parity calculating means for calculating a parity from digital code data W1 and digital block address data W2 which are included by said digital data in accordance with the formula W1 + W2 and detecting the identity of said parity with parity data which is included in said digital data;
said storing means includes flip-flops for temporarily storing said digital code data W1 and said digital block address data W2, respectively, and a parallel shift register having a predetermined number of stages for serially storing said digital code data W1; and
said area detecting means includes a shift clock generating means for generating the same number of shift clock pulses as the number of stages of said parallel shift register, and an area signal generating means for outputting an area signal at the position of a pulse of said shift clock pulse in accordance with the detected area so as to control the comparing operation of said comparing means by said area signal.

11. A searching apparatus according to claim 10, wherein said parallel shift register is reset in synchronism with the generation of a switching signal for switching between said plurality of rotary magnetic heads, whereby the digital data corresponding to the maximum value counted by said counting means during one cycle of tracing by one of said rotary magnetic heads is selected in each area.

* * * * *